United States Patent [19]
Gallagher

[11] Patent Number: 5,920,520
[45] Date of Patent: Jul. 6, 1999

[54] CHARACTERISTIC DISCRIMINATING LANDMINE HAND PRODER

[75] Inventor: Patrick J. Gallagher, Medicine Hat, Canada

[73] Assignee: Her Majesty the Queen in right of Canada, as represented by the Minister of National Defence, Ottawa, Canada

[21] Appl. No.: 09/037,392

[22] Filed: Mar. 9, 1998

Related U.S. Application Data

[63] Continuation-in-part of application No. 08/761,211, Dec. 5, 1996, Pat. No. 5,754,494.

[51] Int. Cl.$^6$ ................................................ G01S 15/00
[52] U.S. Cl. ........................................... 367/87; 367/138
[58] Field of Search ........................... 367/87, 138, 135, 367/13; 89/1.13; 73/591, 642, 644

[56] References Cited

U.S. PATENT DOCUMENTS 5,754,494   5/1998   Gallagher ............................ 367/87

*Primary Examiner*—Daniel T. Pihulic
*Attorney, Agent, or Firm*—Sheridan Ross P.C.

[57] ABSTRACT

A hand-held prodder capable of distinguishing inert rock from potentially hazardous landmines or other unknown objects. The prodder comprises a rod which is placed into contact with an unknown object. A high frequency acoustic wave is introduced into the rod and it is reflected back as an elastic wave. The wave is converted to a signal and is processed to determine values representative of the wave's phase shift, characteristic of the object. Different materials exhibit different acoustic characteristics and alter the wave's phase shift. The phase shift of the wave for an object contact is mixed with the phase shift of a wave for a non-contact for obtaining a solution which isolates the shift due to the object, less the rod's influence. By comparing the phase shift solution against pre-determined solution levels obtained from contact data for known materials, inert rocks are distinguishable from potentially hazardous plastic or metallic objects. Visual or audible signals inform the user whether a rock (safe) or an unidentified (unsafe) object was contacted.

22 Claims, 17 Drawing Sheets

Aluminum

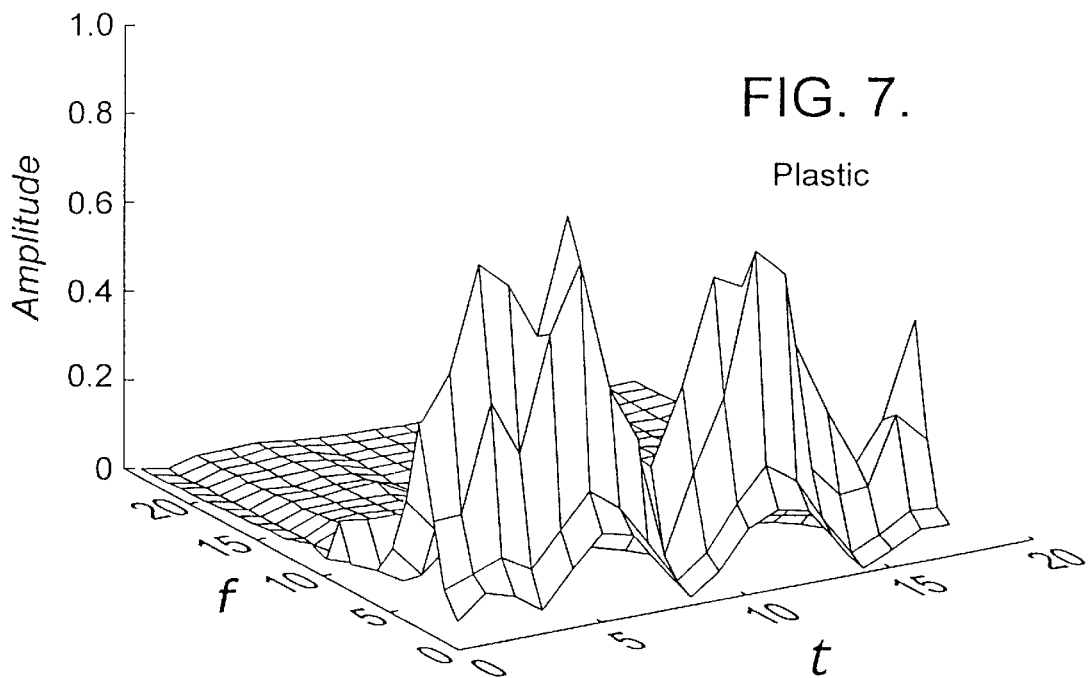
FIG. 7. Plastic
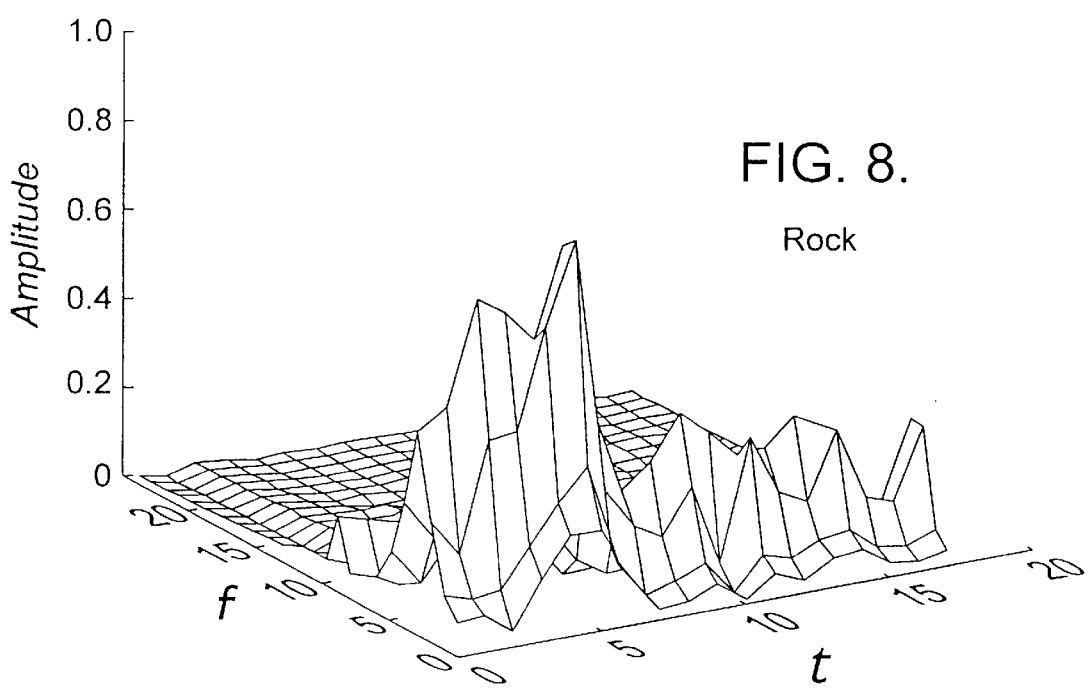
FIG. 8. Rock

CHARACTERISTIC DISCRIMINATING LANDMINE HAND PRODER

CROSS-REFERENCE TO RELATED APPLICATION

This application is a continuation-in-part of pending application Ser. No. 08/761,211 filed Dec. 5, 1996, now U.S. Pat. No. 5,754,494.

FIELD OF THE INVENTION

The present invention is directed to landmine prodding instruments, in particular to instruments which introduce and then analyse acoustic waves which travel within a prod placed in contact with unknown objects, and thus characterize the nature of the material of the object.

BACKGROUND OF THE INVENTION

Despite a variety of mechanised means now available for detecting and clearing landmines, the current hand tool of choice is the hand prodder. Personnel exhibit greater confidence when traversing a minefield which has been hand-prodded by their compatriots than they do with fields cleared by other means.

The hand prodder typically comprises a 30 cm long pointed rod extending from a gripping handle. The probe is generally non-magnetic to avoid setting off magnetically-triggered mines. The user probes the ground ahead and excavates any hard objects which the probe contacts. As the ratio of rocks to landmines in a minefield may number 1000:1, excavation of every contact is labourious, but very necessary.

Thus, it would be a significant advance in the art should a user be able to discriminate between landmines and rocks upon contact and without excavation. Accordingly, applicant sought to provide a hand probe which could distinguish variations in the object's material characteristics.

As shown in FIG. 1, known apparatus for measuring the compressive characteristics of materials include the Split Hopkinson Pressure Bar apparatus ("SHPB"). The SHPB is typically used to apply rapid strain rates (100,000 mm/mm/second) to samples; compressing them for the measurement of mechanical properties. A sample is placed between the ends of two axially aligned elastic bars. Maintaining elastic conditions in the bar, the first "incident" bar is struck, rapidly compressing the sample between the incident bar and the second "transmitter" bar.

The act of striking the incident bar sends a high frequency elastic mechanical pulse or compression wave through the bar. Like an acoustic wave, it reflects from interfaces having differing characteristics. Dependent upon the samples material characteristics, a portion of the wave reflects from the incident bar/sample interface and travels back along the incident bar. The remainder of the wave passes through the sample. A lesser reflection occurs at the transmitter bar/sample interface. The residual portion of the wave continues as a compression wave along the transmitter bar.

Strain gauges located on both the incident and transmitter bars enable calculation of the strain in the bars. In the incident bar, the displacement of the bar's end is proportional to the sum of the strain in the bar which is calculated from time-shifted strain gauge data obtained for both the incident and reflected waves. The displacement of the transmitter bar end is proportional to the strain measured in the transmitter bar. The sum of the displacements of the ends of the incident and transmitter bars defines the compression of the sample.

Mechanical impedance ("MI") is a material's characteristic which relates to the material's effect on acoustic wave transmission and reflection. Not surprisingly, MI affects the nature of the reflected wave in the SHPB's incident bar. The effect of MI on the SHPB apparatus, for materials having differing MI values, is described for three particular cases as follows.

In a first case, following the basic rules of mechanics of materials, if the MI of the sample is the same as that of the bar, then there is no reflective interface and thus no wave reflection at all; the sample is elastically displaced exactly as is the bar itself. The displacement at the bar's end is directly proportional to the measured strain ($\epsilon$).

If MI of the sample is very much greater than that of the bar, then the sample's MI is effectively infinity, and all of the incident wave is reflected. The incident and reflected waves are also in phase. The reflected wave is therefore also compressive and equal in magnitude to the incident wave. Thus the resultant bar end displacement is zero.

If the MI is zero (no sample at all, unconstrained bar end), the reflected wave is tensile, but of equal magnitude to the incident wave. The phase of the wave shifts 180° and is thus out of phase. In other words, the net stress cancels and the relative displacement at the bar end equals twice that for the first case ($2 \times \epsilon$).

In tabular form, the above cases and the general case are shown as:

| Case | MI Sample | Strain Incident $\epsilon_i =$ | Strain Reflected $\epsilon_r =$ | Proportional Displace $(\epsilon_i - \epsilon_r)$ |
|---|---|---|---|---|
| 1 | = bar | $\epsilon_i$ | 0 | $\epsilon_i$ |
| 2 | ∞ | $\epsilon_i$ | $\epsilon_i$ | 0 |
| 3 | 0 | $\epsilon_i$ | $-\epsilon_i$ | $2 \times \epsilon_i$ |
| General | ? | $\epsilon_i$ | $\epsilon_r$ | $(\epsilon_i - \epsilon_r)$ |

Knowing the relative displacements of the bars, the displacement imposed on the sample is also known. From the Young's Modulus (E) and the displacement of a bar, the imposed stress is also known. The force imposed is equal to the product of the stress and bar's cross-sectional area. Thus the strain and stress functions as they apply to the sample may also be determined.

As the loading on the sample substantially equalizes after a very short time, it is known to make a simplifying assumption and merely apply the strain results for either one of the incident bar or the transmitter bar. In another arrangement, the striker is permitted to impact directly on the sample, and the transmitter bar results alone are used to define the sample characteristics.

The question is, can such an approach be successfully applied to materials as diverse as plastics, minerals and metals and enable one to sort out non-hazardous from the potentially hazardous prodder contacts.

SUMMARY OF THE INVENTION

The present invention provides a hand prodder having a rod which is fitted with means, preferably one or more piezoelectric crystals, for introducing an acoustic wave to the bar and for converting reflected waves into electric signals. A signal processor analyses the signals and establishes measurements representative of the acoustical characteristics of the object. The acoustical characteristics for the unknown object are compared with pre-determined characteristics for known objects for identifying the unknown object. Accordingly, the novel prodder provides the means for identifying the characteristics of unknown objects, and more preferably for distinguishing landmines from inert rocks.

The novel method comprises first positioning the rod into contact with an object and introducing a high frequency acoustic wave. The resultant incident elastic wave travels to the object where it is reflected back and is converted into an electric signal. A signal processor processes the signal and establishes values for the phase shift of the wave which is characteristic of the object. The values for phase shift for the object are compared to pre-determined values for phase shifts for contact of the rod with known materials. More particularly, values for phase shift are first determined for use of the rod without contacting an object. These non-contact or rod-alone phase shift values are mathematically combined with the phase shift values obtained for contact with an object, thereby providing a solution which identifies the phase shift due to the object and not due to the rod. The phase shift solution is compared to pre-determined solution levels which discriminated between inert rocks and potentially hazardous softer plastic or harder metallic objects. Preferably the result of the comparison is signalled visually or audibly to alert the user to contact of a rock (safe) or of an unidentified (unsafe) hazardous object.

BRIEF DESCRIPTION OF THE DRAWINGS

FIG. 7 depicts the power chart for plastic;

FIG. 8 depicts the power chart for rock;

The symbols in FIG. 29 correspond to materials as follows:

| Symbol | ID | Material |
| --- | --- | --- |
| Solid diamond | caa | High density armour ceramic ($Al_2O_3$); |
| Large circle | aba | Brass; |
| Large square | ala | Aluminium; |
| Open diamond | asa | Steel; |
| Small circle | bcs | Brass cartridge; |
| Small plus | raa | Agate; |
| Large X | rpa,rqa | Feldspar, quartz; |
| Large plus | rra,rsa | Shale, sandstone; |
| Large asterisk | rfa | Bloodstone, haematite; |
| Small open square | pla,pna,pua | Polyethylene, nylon, polyurethane; and |
| Small solid square | woa | Wood (soft). |

DETAILED DESCRIPTION OF THE PREFERRED EMBODIMENT

Figure 2:
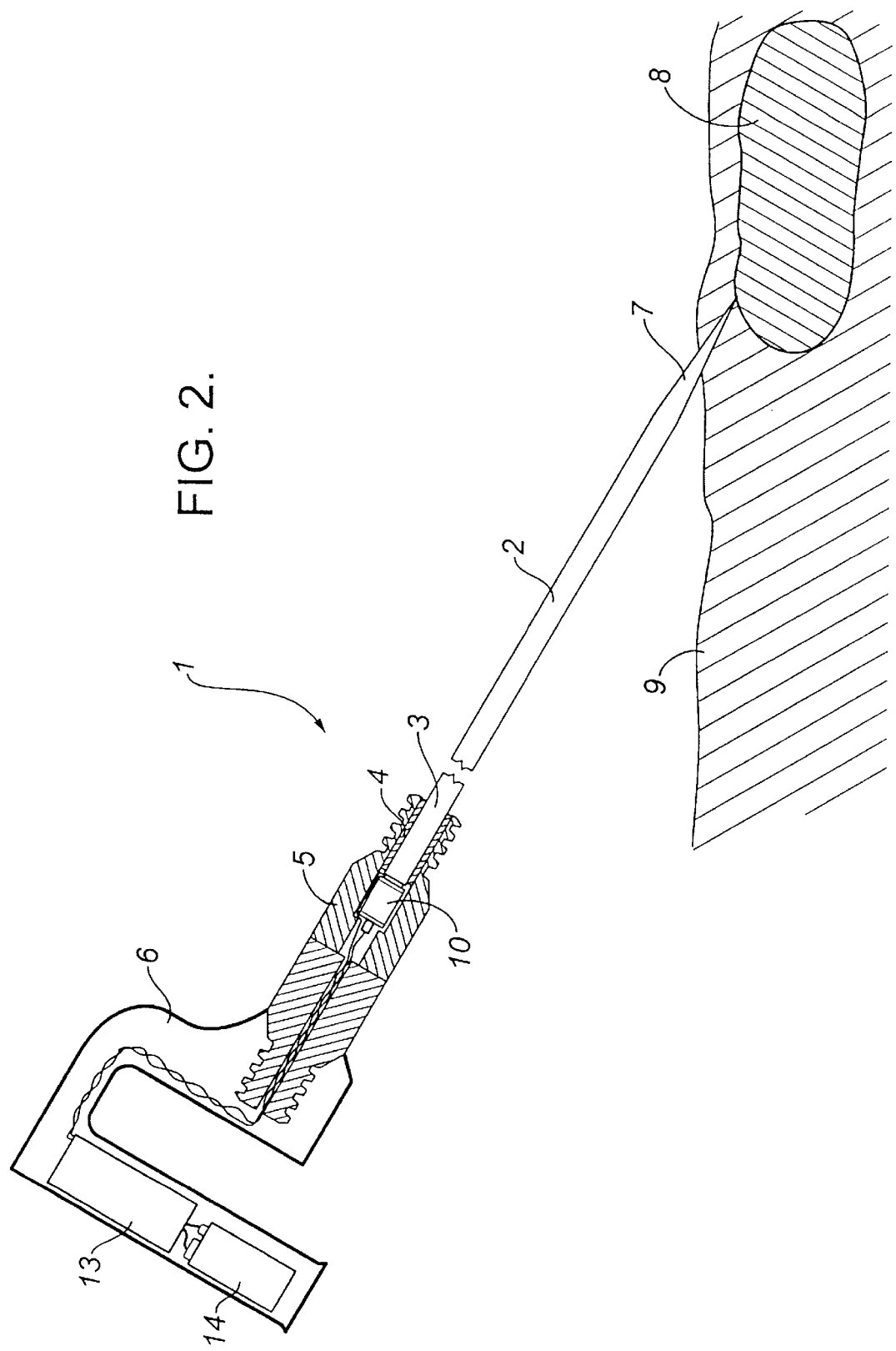
FIG. 2 is a cross-sectional view of the hand prodder contacting a sub-surface object.
Figure 3:
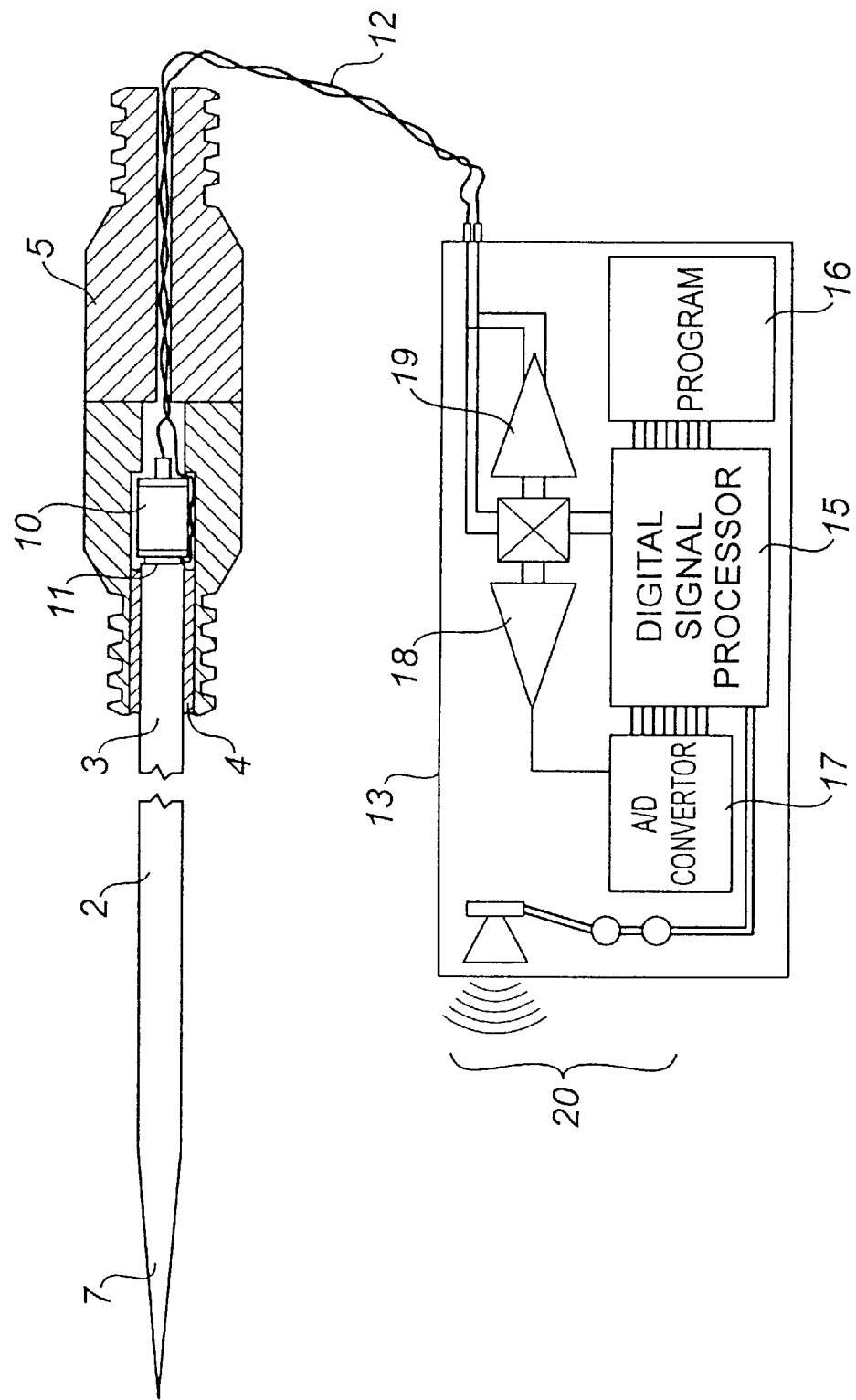
FIG. 3 is a cross-sectional view of the rod and piezoelectric crystal portion of the prodder, coupled to the signal processing module.

Having reference to FIGS. 2, 3, a hand-probing mine detector or prodder 1 is provided. The prodder comprises a rod 2 having a first end 3 flexibly supported by an annular rubber coupling 4 in a mounting nub 5. The nub 5 is screwed into a handle 6. The rod has a pointed second end 7 for sensing objects 8 buried in the ground 9. A protective sheath (not shown) fits over the rod's second and 7 and threads to the nub 5.

The rod 2 is 45 cm long and is formed of non-magnetic, austenitic stainless steel. Only 30 cm project from the rubber coupling 4. The rubber coupling 4 lessens the rigidity between the rod 2 and handle 6.

Best seen in FIG. 3, a piezoelectric crystal 10 is glued to the first, or driver end 3 of the rod 2. When an electric field is applied to the crystal 10, a mechanical strain will occur and drive mechanical energy into the rod's driver end 3. Conversely, when the crystal 10 is mechanically stressed, an electric charge is produced. A suitable crystal is a 15 mm long, 6.35 mm diameter poly-crystalline ceramic cylinder, model Sonex P-41 available from Hoechst CeramTec, Mansfield, Mass. The crystal 10 is electrically insulated from the rod 2 with a ceramic insulator 11.

Figure 1:
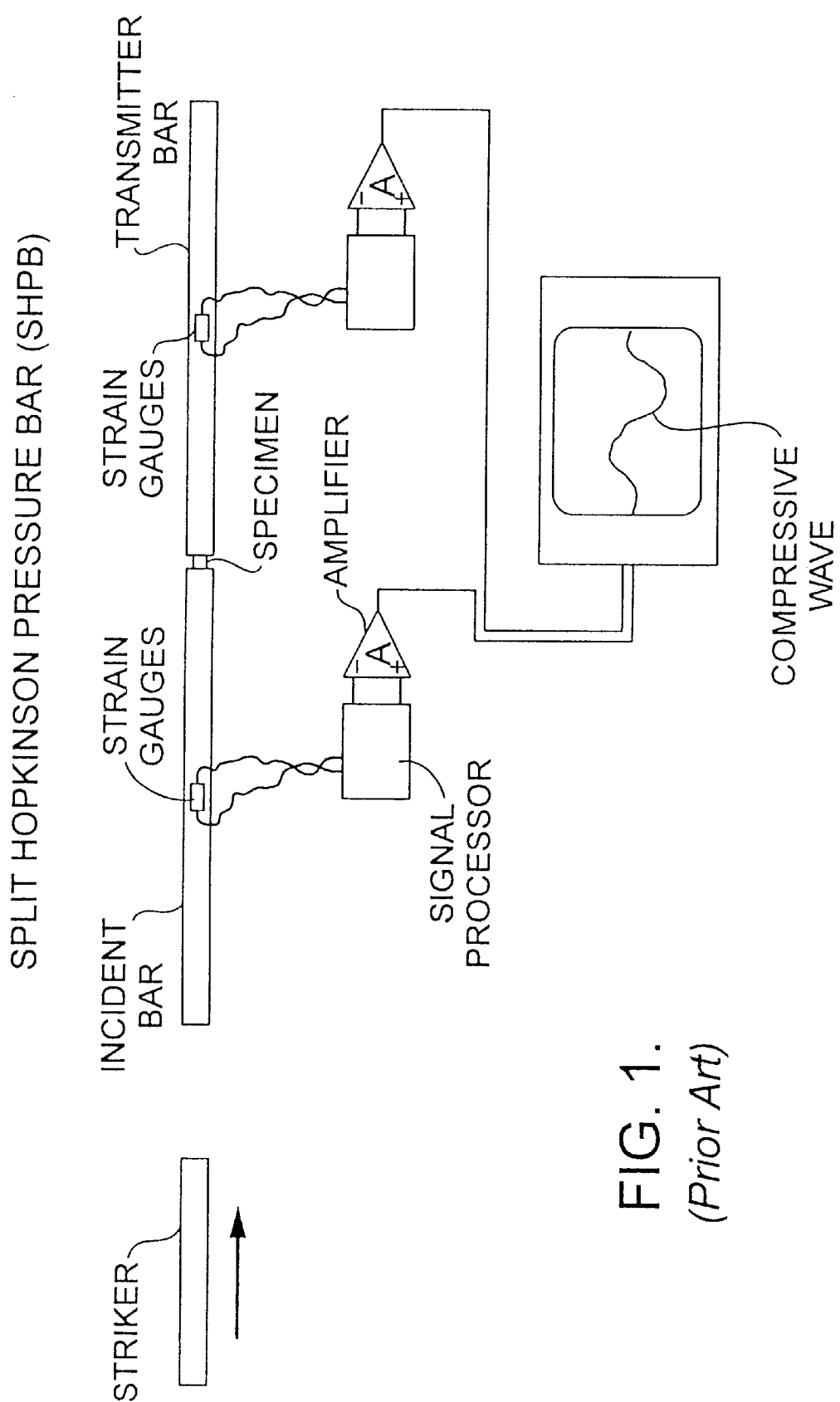
FIG. 1 is a schematic of a prior art materials testing apparatus known as the Split Hopkinson Pressure Bar.

Positive and negative electrical leads 12 from the crystal pass through the nub 5 for bi-directional electrical signal transmission between the crystal 10 and an electronics module 13. Shown in FIG. 1, the module 13 is installed within the prodder's handle and is powered with batteries 14, such as a 9 V or 2–1.5 V AA size batteries.

The electronics module 13 is capable of two modes: a driver mode and a signal processing mode. In the driver mode, an electrical signal is transmitted along leads 12 to the crystal 10 for generating a piezoelectric mechanical pulse. The pulse is introduced into the rod's driver end 3. In the signal processing mode, any electrical signals generated by the crystal 10 are transmitted along leads 3 for processing by the electronics module 13.

More specifically, the module 13 comprises a digital signal processing microcomputer 15, an EPROM 16 containing program instructions and digital storage means, an A/D converter 17, a signal input amplifier 18 and a driver output amplifier 19. An audio/visual binary output device 20 is provided.

A suitable signal processor is a model ADSP-2181 digital signal processing microcomputer by Analog Devices, Inc., Norwood, Mass. The ADSP-2181 contains a high speed serial port, 16 bit data processing capabilities and has both onboard program RAM and data memory RAM. For permitting battery powered operation, the ADSP-2181 features a power saving "sleep" mode. After downloading of program instructions from the EPROM, the ADSP-2181 will reduce its power consumption and await a suitable trigger before "waking-up" to begin signal processing.

Figure 4:
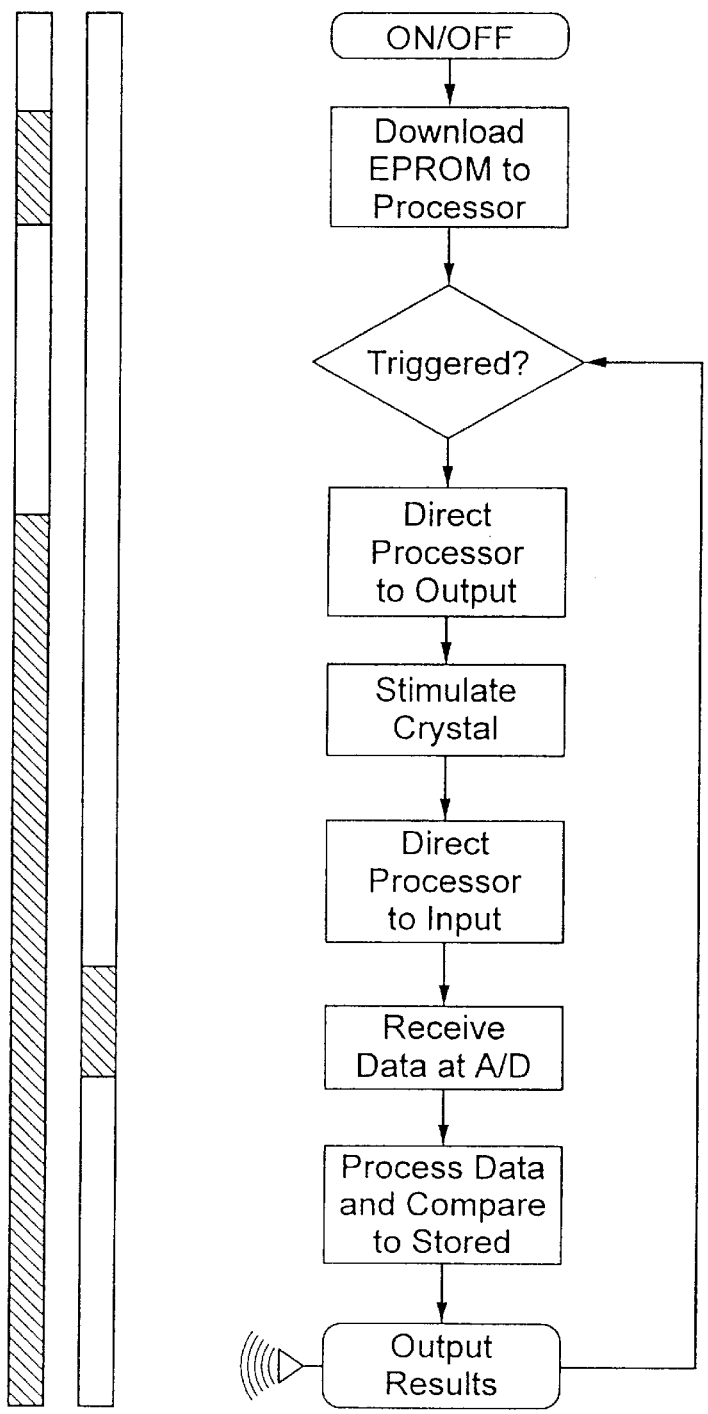
FIG. 4 is a flow chart of the digital signal processor and A/D functions. The periods of active "wake-up" and "sleep" operations trace the flow chart steps.
Figure 5:
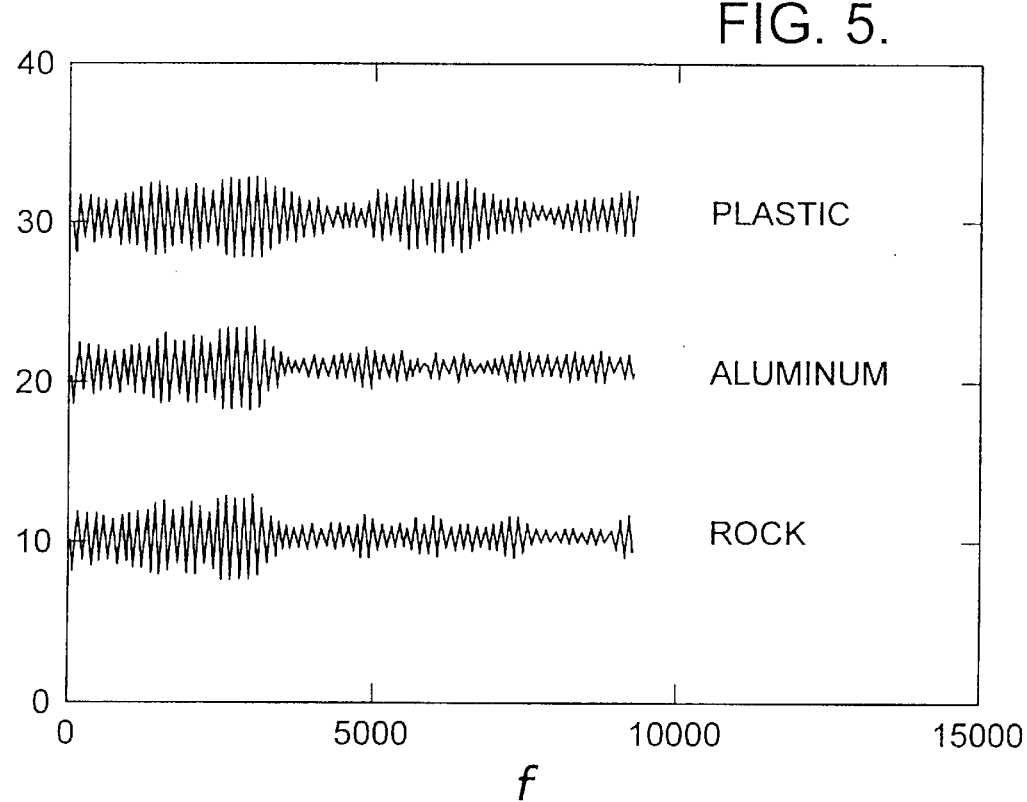
FIG. 5 illustrates the raw piezoelectric signals for plastic, aluminum and rock.

Having reference to the flow chart in FIG. 4, when the prodder is activated, the EPROM 16 downloads the analysis program to the ADSP-2181 processor 15 and awaits a trigger. When triggered (ie. contact of the rod's sensing end with an object) the EPROM 16 signals the driver output amplifier 19 to generate an ultrasonic analog driver signal (20–200 kHz). The driver signal stimulates the crystal 10 to generate a mechanical pulse and send it as an acoustic incident elastic wave down the longitudinal axis of the rod 2. The incident elastic wave reflects from the object 8 at the rod's sensing end 7 and returns to the rod's driver end 3 as a reflected wave. The mechanical energy in the reflected wave stimulates the crystal 10 to generate electrical analog signals characteristic of the reflected wave. FIG. 5 illustrates typical reflected waves for plastic, aluminum and mineral (rock) objects 8.

Practically, the form of the reflected wave will have characteristics which fall between that which is received in response to either of the two boundary cases; one where there is no object; and secondly where the object is infinitely stiff.

The analog signals are processed through the signal input amplifier 18 and converted by the A/D converter 17 for analysis by the signal processor 15. A suitable A/D converter is available as model AD876 10 bit, 20 MSPS (million samples per second) CMOS converter, also from Analog Devices, Inc. The AD876 is also capable of a "sleep" mode.

The digital processor 15 stores signal and other data in its RAM memory, including the reflected wave signal. The characteristics of the reflected signal are dependant upon the material characteristics of the object 8. Different materials have different MI and frequency-dependent damping coefficients. Analysis of the reflections and damping rates demonstrated in the reflected data is instructive of the material characteristics of the object.

Accordingly, using one analytical technique, the stored data is conditioned using a stepping FFT and analyzed for frequency-time-amplitude information. A 256 point FFT from a 1024 sample is advanced in 128 sample steps which yields 7 time-slices of FF transformed data.

Figure 6:
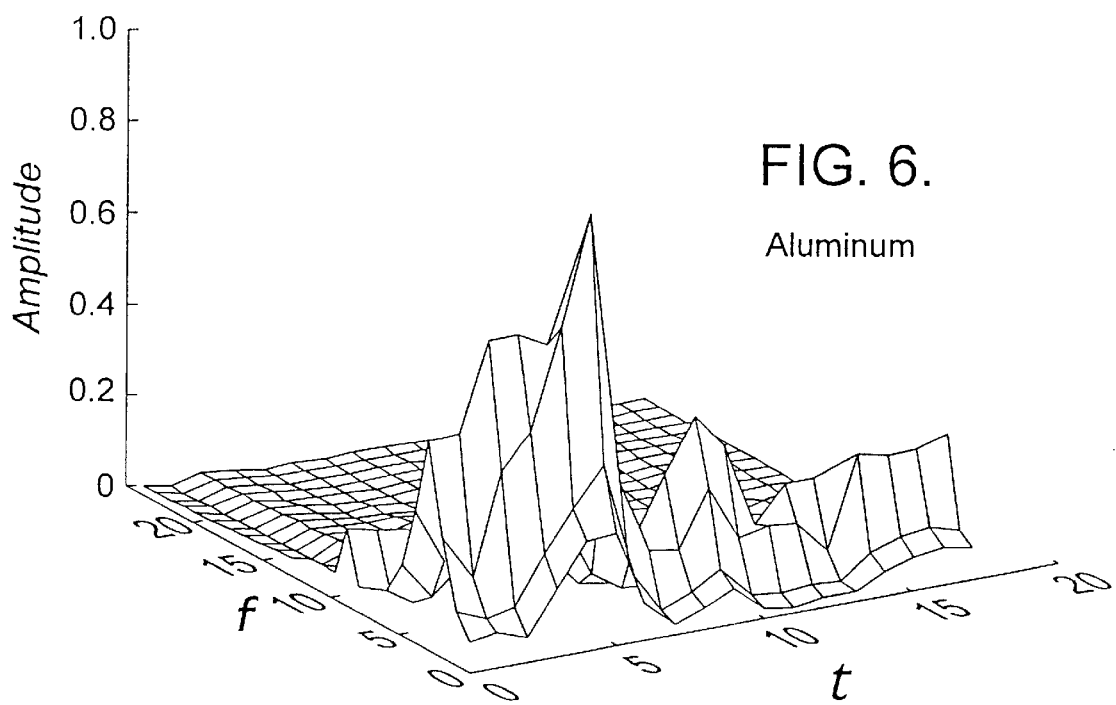
FIG. 6 depicts the power chart (frequency-time-amplitude) for aluminium, after the processor conditioned the signal of FIG. 5 using Fast Fourier Transform.

The characteristics distinctive of the material are generally located within the first 5–10 harmonics or bins of the transformed data. FIGS. 6,7,8 illustrate the transformed data for the signals of FIG. 5.

First, the effects of the peculiar characteristics of the rod are calibrated by causing the piezoelectric crystal to send a pulse along the rod when its sensing end is not contacting anything. This "dry-fire" provides a baseline reading which accounts for individual characteristics including the tapered point of the bar, wear, temperature, and accumulated debris. This resulting baseline power data is subtracted from the actual contact data.

Average signal frequency-time-amplitude or power data, contained within 5 frequency by 7 time slices of the FF transformed data, are compared against predetermined and stored average map values for known materials.

Figure 9:
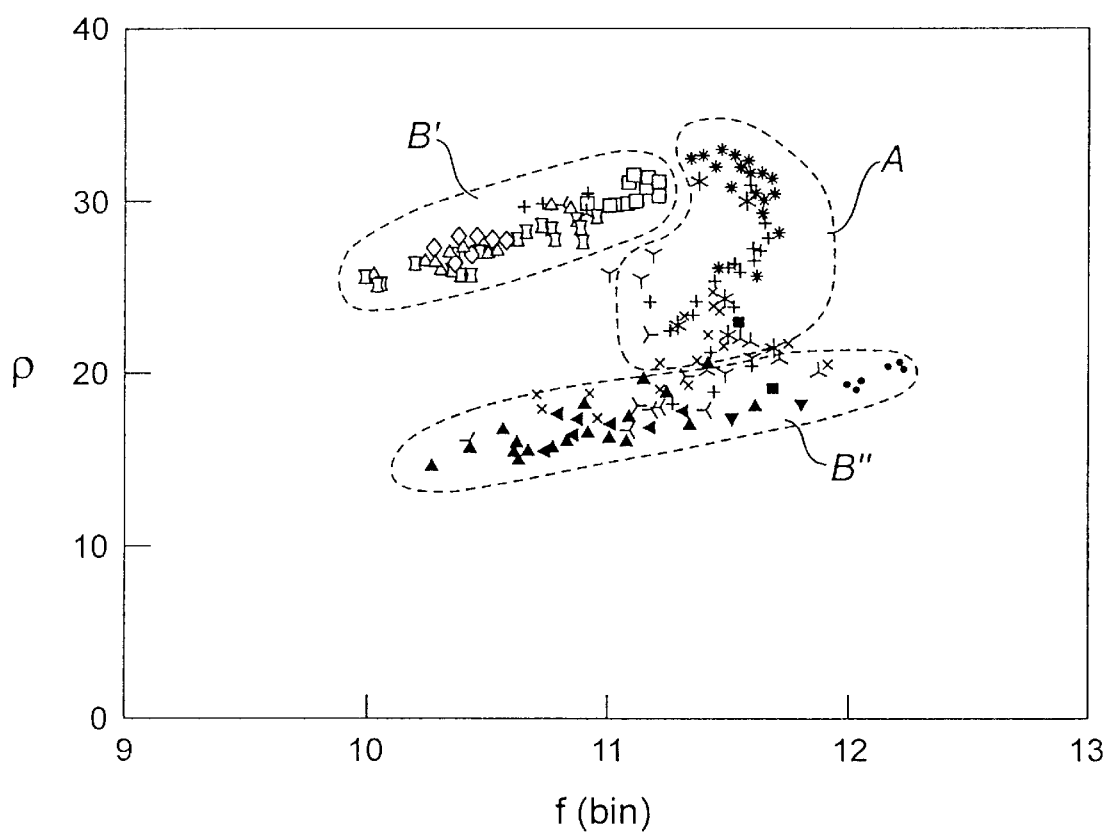
FIG. 9 is a map of the average transformed frequency-time-amplitude for a plurality of tests, illustrating distinct grouping of test results for metals (lower solid symbols), plastics (upper open symbols) and rock (line symbols)

FIG. 9 illustrates mapped test results for a large number of samples of a variety of metals, plastic and rock, representing common conditions in landmine detection conditions. The three material types showed up as three distinct groupings with some overlap.

The processor 15 performs a comparison of a map of the transformed signal and mapped known groupings. The comparison is directed to differentiation between a first group A representing rock (excluding indistinct overlap areas), and a second group representing the plastics B', metals B" and the overlap areas. The signal processor signals the audio/visual output device 20 to signal one of two results: safe— definitely a rock, or bad/suspect—something other than a rock. Use of two distinctive audible tones and green/red LED lights serve this purpose.

Non-contact calibration can be done before each use to account for physical prodder variations. The extraction of the baseline rod characteristics heightens the sensitivity of the signal analysis, having removed a portion of the signal which is not attributable to the object. Similarly, the non-contact data can be compared against stored laboratory calibration to alert the user to performance variation beyond safe limits.

In an alternate analytical technique, some of the computing intensity required by the FFT technique can be simplified by substitution of a phase analysis technique. By mixing or multiplying non-contact wave data and the reflected wave data, the phase differences become apparent and the phase angle shifts determinable. As was the case with power data determined using FFT analysis and depicted in FIG. 9, phase angle shift analysis will result in phase shift angles which are indicative and distinctive of metals, rocks and plastics.

Figure 10A:
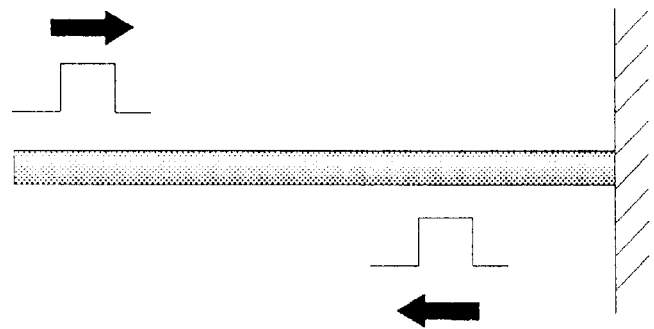
FIGS. 10a and 10b illustrate the effect on the phase of an acoustic pulse for a rod contacting an infinite impedance object (same phase) and a zero impedance object (phase reversal) respectively.
Figure 10B:
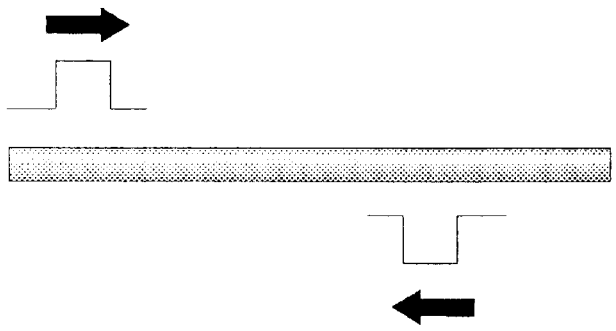

As introduced in the Background of the invention, at a rod-object interface, the pulse will be partially reflected and partially transmitted. As shown in FIG. 10a, if $MI_{object} \gg MI_{rod}$, then the object is very much stiffer than the rod, all of the pulse is reflected and remains in phase with the original pulse. If $MI_{object} = MI_{rod}$, the object stiffness matches that of the rod and there is no reflective interface and thus no reflection. Finally, as shown in FIG. 10b, if $MI_{object} \sim 0$ ($\ll MI_{rod}$), the object is very much more compliant than the rod, all of the pulse is reflected, but it's phase is inverted or is out of phase from the original pulse by 180° or $\pi$.

Basically, an acoustical pulse stream travels up and down the rod multiple times (pulse-echoes), interacting with the object and returning to the crystal to generate an electrical signal upon each return. A finite number of echoes are realized before the signal level is damped and drops below the noise level. Whatever the starting energy, there is an exponential decay of signal strength with time, even in the case of a non-contact. This is represented by a damping factor or relationship presented in equation (1).

$$|signal(f)| \propto e^{-(df_0 t)} \qquad (1)$$

where $f_0$ is the initial frequency of the pulse (Hz); and where $df_0$ is the damping factor for the pulse-echo stream.

The pulse-echoes are essentially sine-wave packets that can most easily be realized mathematically as a sine wave with time dependent phase steps (as a result of reflections at both the crystal end and the tapered end), convoluted with an envelope function that demarks the individual echoes, all multiplied by the above damping factor.

$$signal(t) = A_0 e^{-df_0 t} envelope(t) \cos(2\pi f_0 t + \psi_i(t)) \qquad (2)$$

Figure 11:
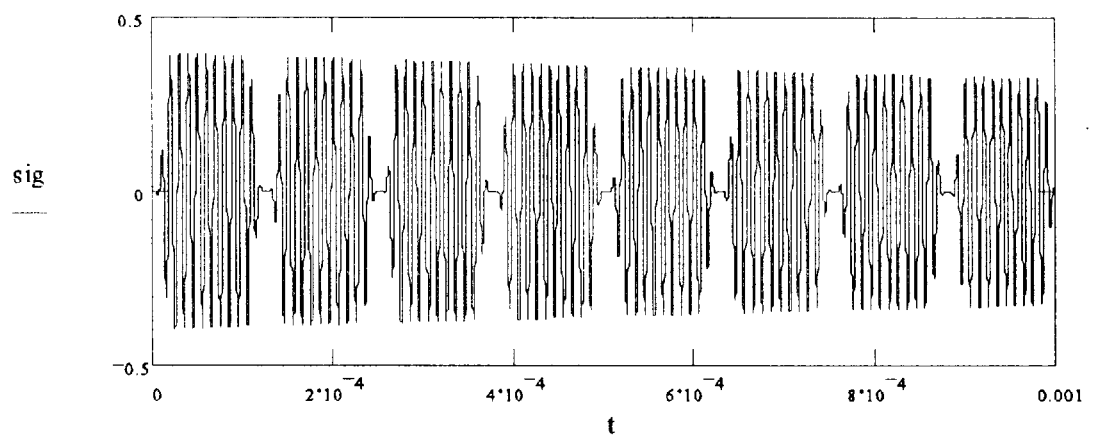
FIGS. 11 and 12 are graphs which illustrate the theoretical pulse-echo signals, over time, which result from no contact and contact with an object respectively.

$A_0$ and $df_0$ are used to define the initial amplitude and the damping factor for a non-contact pulse-echo stream. The frequency of the pulse is $f_0$ (Hz or $\omega_0 = 2\pi f_0$ radians/s). The term $\psi_i(t)$ represents the phase shift due to the rod itself. The i subscript denotes the echo number ($1^{st}$, $2^{nd}$, etc.). The signal(t) for an acoustic pulse-echo in a non-contact condition is shown in FIG. 11. Note the diminishing amplitude with each echo.

With a contact, the boundary condition at the rod's sensing end changes, and there is an additional phase shift term $\phi(t)$ on the pulse stream. The amplitude ($A_x$) may also be affected, and the damping rate ($df_x$) will depend on the contact material and how much of the signal is transmitted into the object. Note that frequency can be represented as $\omega_0 = 2\pi f_0$ radians/s.

$$signal(t) = A_x e^{-df_x t} envelope(t) \cos(\omega_0 t + \psi_i(t) + \phi_i(t)) \qquad (3)$$

Figure 12:
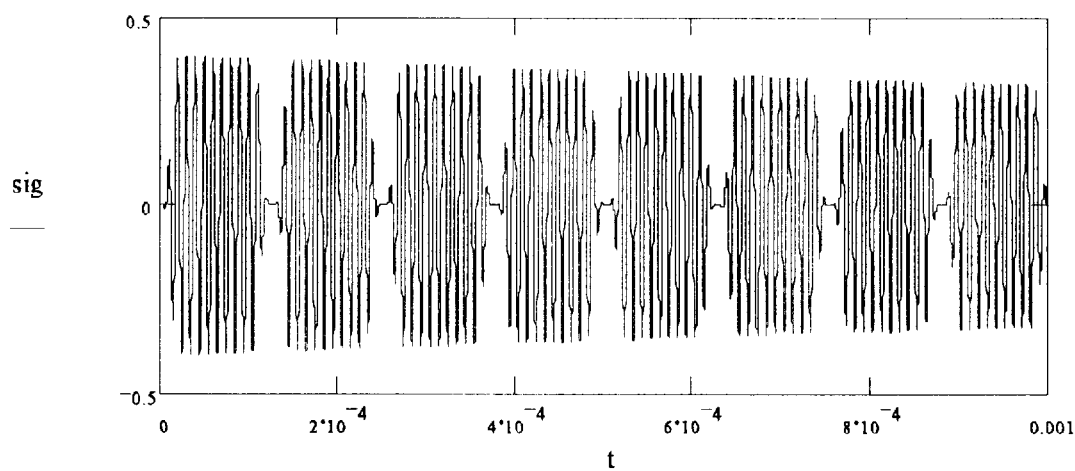

Accordingly, equation 3 is mapped in FIG. 12 and demonstrates the signal(t) for an acoustic pulse-echo for a contact condition. Only a dramatic difference in either $A_x$ or $df_x$ or both would distinguish the signal from the non-contact case.

However, since there is at least a phase difference, the change can be made more evident by mathematical combination or mixing techniques. The non-contact pulse-echo stream contains all the phase, amplitude and damping information of the rod itself including the taper, the crystal, attachment, housing, imperfections in the rod, tip radius, temperature effects, etc. Adding the effect of an object contact to the rod's sensing end, merely adds the effect of the object's boundary condition. It is advantageous to isolate and review only the information which relates to the object.

Mixing comprises multiplying a stored, non-contact waveform with the sample (object contact) waveform and the result makes the phase differences apparent.

Having reference to FIGS. 13–16, a series of signals representing increasingly larger phase shifts per echo are depicted after having mixed them with a non-contact signal.

Figure 13:
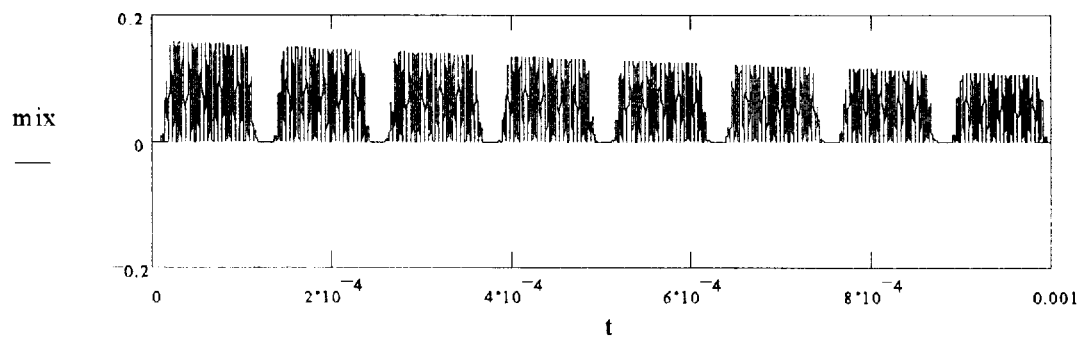
FIG. 13 is a graph illustrating the effect of mixing, over time, a baseline no contact signal with a signal generated from no contact demonstrating no phase shift.

FIG. 13 represents the non-contact case, mixed with itself. As $\psi_i$ is unchanged and $\phi_i = 0$, the mixed signal is simply the square of the original pulse-echo stream. The result is a signal with no negative component, representing a zero relative phase shift between echos; accordingly the mixed signal does not drop below zero.

Figure 14:
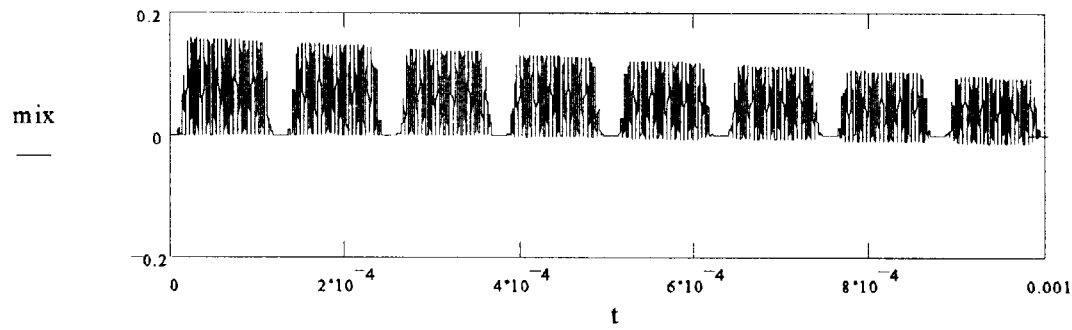
FIGS. 14–16 is a graph illustrating the mixing, over time, the signals generated from a soft, medium and hard object respectively with a signal generated from no contact, phase shift being demonstrated by the negative values.
Figure 15:
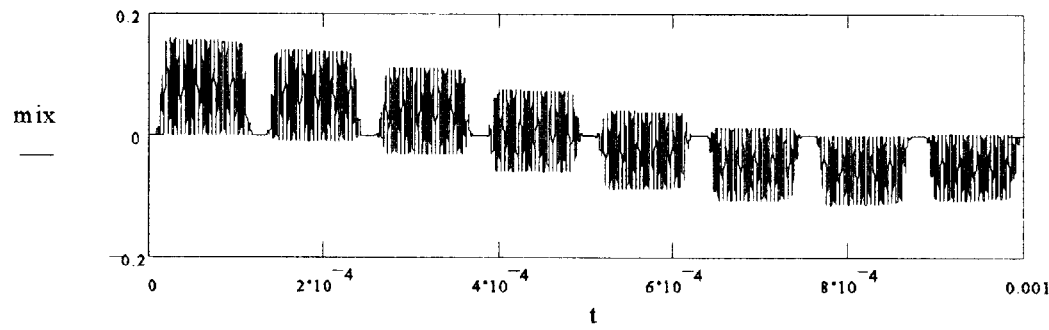
Figure 16:
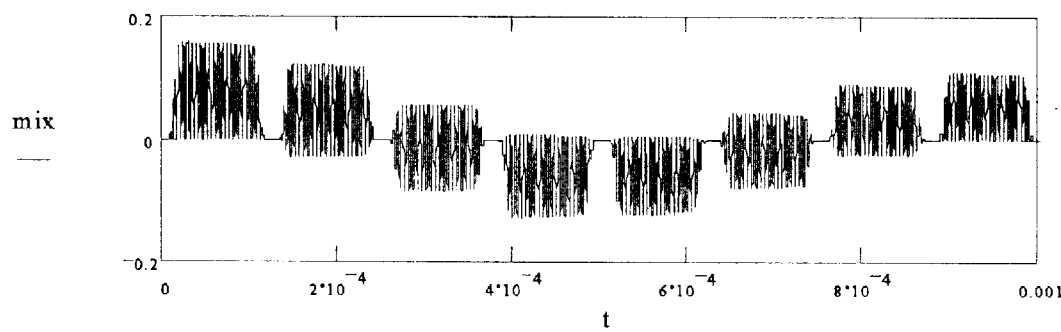

FIGS. 14–16 illustrate signals for soft (plastic-like), medium (rock-like) and hard (metal-like) contacts. As shown in FIG. 14, the phase shift is represented by a small negative shift in the mixed signal. Referring to FIG. 15, as the MI of the object increases (gets harder), the mixed signal is pushed out of phase earlier as indicated by the rate at which the mixed signal goes negative. As shown in FIG. 16, at high values of MI, the rate at which the phase shifts is fast enough that the signal has time to be pushed back into phase (positive) before the signal is completely damped out.

Mathematically, the mixing of non-contact signals is represented by $$\begin{aligned} signal(t) \times signal(t) &= A_0^2 e^{-2df_0 t} \cos^2(\omega_0 t + \psi_i(t)) \\ &= A_0^2 e^{-2df_0 t} \frac{1}{2}(\cos(2\omega_0 t + 2\psi_i(t)) + 1) \end{aligned} \qquad (4)$$

There is a doubling of the signal frequency ($\cos(2\omega_0 + 2\psi_i(t)) + 1$), which is seen by the difference in density of the signal between FIGS. 11 and 13. Further, the damping rate is doubled. The cosine term varies from −1 to +1, thus the +1 term in the right hand term ensures a positive only signal.

With the introduction of an object with finite impedance and damping, the mixed solution is $$\begin{aligned} signal_x(t) \times signal_0(t) &= A_x A_0 e^{-(df_x + df_0)t}(\cos(\omega_0 t + \psi_i(t)) \times \\ &\quad \cos(\omega_0 t + \psi_i(t) + \phi_i(t))) \\ &= A_x A_0 e^{-(df_x + df_0)t} \frac{1}{2}(\cos(2\omega_0 t + 2\psi_i(t) + \\ &\quad \phi_i(t)) + \cos(\phi_i(t))) \end{aligned} \qquad (5)$$

Equation (5) contains mixed amplitude, oscillatory and phase shift terms. The oscillatory part of the solution now contains a harmonic wave at twice the driver frequency ($\cos(2\omega_0 t + 2\psi_i(t) + \phi_i(t))$), plus a phase dependent term $\cos(\phi_i)$ or dc shift. If $\phi_i = 0$ (non-contact, FIG. 13), then the dc shift is $\cos(0) = 1$ as before. However, if there is a finite phase shift ($\phi_i$ 0) due to the presence of an object, then the dc shift can take on any value between +1 and −1. This allows fully positive echoes (+1) through and into fully negative (−1) echoes.

For each echo, one can determine the dc shift level of the echo by integrating the signal(t) over the duration of the echo and dividing this by the duration (total time) as follows, $$\text{absolute } dc_{echo_i} = \frac{\int_{echo_i} signal_x(t) \times signal_0(t) dt}{\int_{echo_i} dt} = \frac{\int_{echo_i} mixed_{x0}(t) dt}{\int_{echo_i} dt} \qquad (6)$$

Where the i indicates the ith echo.

In order to extract the $\cos(\phi_i(t))$ term, integration of the $mixed_{x0}(t)$ term is required. The integration across an echo of the general mixed signal proceeds as follows, $$\int_{echo_i} mixed_{x0}(t) dt = \qquad (7)$$

$$\int_{echo_i} A_x A_0 e^{-(df_x + df_0)t} \frac{1}{2}(\cos(2\omega_0 t + 2\psi_i(t) + \phi_i(t)) + \cos(\phi_i(t))) dt$$

The constants $A_x$, $A_0$ and the ½ can immediately come outside the integral. Further, if one assumes that the damping during an echo is slow relative to the duration of the integral, then the exponential factor can be assumed roughly constant and also brought outside. This leaves $$\int_{echo_i} \text{mixed}_{xO}(t) dt \approx \qquad (8)$$

$$\frac{A_x A_0 e^{-(df_x+df_0)t_{ave}}}{2} \int_{echo_i} (\cos(2\omega_0 t + 2\psi_i(t) + \phi_i(t)) + \cos(\phi_i(t))) dt$$

If the echo contains an integral number of wavelengths of frequency $2\omega_0$, then the left term $(\cos(2\omega_0 t+2\psi_i(t)+\phi_i(t)))$ in the integrand will return zero. This leaves only the constant (over the echo) term of $\cos(\phi_i(t))$. Thus, approximately, the integral, over the ith echo, evaluates to $$\int_{echo_i} \text{mixed}_{xO}(t) dt \approx \left(\frac{A_x A_0 e^{-(df_x+df_0)t_{ave}}}{2}\right) \cos(\phi_i(t)) \int_{echo_i} dt \qquad (9)$$

$$\approx \text{amplitude}(\text{mixed}_{xO_i}(t)) \cos(\phi_i(t)) \int_{echo_i} dt$$

Thus absolute dc is given by $$\text{absolute } dc_{echo_i} = \frac{\int_{echo_i} \text{mixed}_{xO}(t) dt}{\int_{echo_i} dt} \qquad (10)$$

$$\approx \frac{\text{amplitude}(\text{mixed}_{xO_i}(t)) \cos(\phi_i(t)) \int_{echo_i} dt}{\int_{echo_i} dt}$$

$$\approx \text{amplitude}(\text{mixed}_{xO_i}(t)) \cos(\phi_i(t))$$

Substituting this result into equation (10) for the dc value of the echo, one can arrive at a proportional dc level for each echo. The proportional dc level is the dc level of the echo relative to that echo's amplitude (amplitude=½ of the peak-to-peak value). It is this proportional dc level that varies as the $\cos(\phi_i(t))$. In fact, the $\phi_i(t)$ can be determined for each mixed echo, $$\text{proportional } dc_{echo_i} = \frac{\text{absolute } dc_{echo_i}}{\text{amplitude}(\text{mixed}_{xO_i}(t))} \qquad (11)$$

$$= \frac{\text{amplitude}(\text{mixed}_{xO_i}(t)) \cos(\phi_i(t))}{\text{amplitude}(\text{mixed}_{xO_i}(t))}$$

$$= \cos(\phi_i(t))$$

In simpler but less rigorous terms, the $\cos(\phi_i(t))$ term is related to the proportioning of the mixed signal above and below zero. The bounding examples are $$\cos(\phi_i(t)) = 1, \quad \text{all of mixed}_{xO}(t) \geq 0$$

$$\cos(\phi_i(t)) = -1, \quad \text{all of mixed}_{xO}(t) \leq 0$$

$$\cos(\phi_i(t)) = 0, \quad \text{half of mixed}_{xO}(t) \geq 0 \text{ and half} \leq 0$$

A numerically stable and simple method for measuring the apportioning of the signal around zero is realized by integrating the positive and negative parts of the signal separately and then forming the sum and difference. The sum is simply the dc level times the echo duration. The difference is a measure of the signal size (though not simply related to the amplitude).

$$\text{Apportion(sig)} = \qquad (12)$$

$$\frac{\int_{echo_i} [\text{mixed}_{xO}(t) > 0] dt + \int_{echo_i} [\text{mixed}_{xO}(t) < 0] dt}{\int_{echo_i} [\text{mixed}_{xO}(t) > 0] dt - \int_{echo_i} [\text{mixed}_{xO}(t) < 0] dt} = \frac{P+N}{P-N}$$

Figure 17:
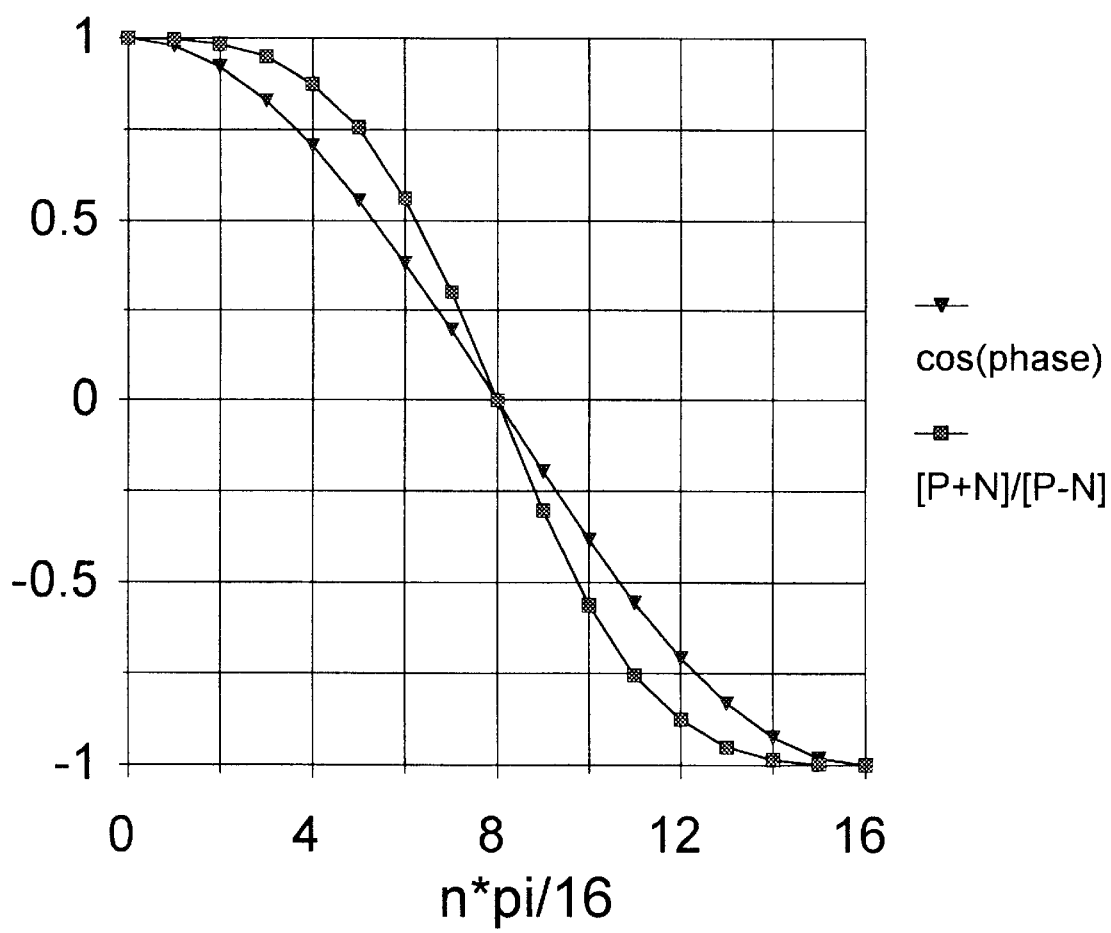
FIG. 17 is a graph illustrating the apportioning of the phase shift relative to the signal's amplitude (square symbol) and theoretical dc shift (cosine(phase)) as it relates to the particular echo.

As shown in FIG. 17, this apportioning bears a resemblance to the term $\cos(\phi_i)$, matching at the ends (±1) and zero, but does not follow it exactly.

In order to more closely evaluate the proportional dc, a means for determining the effective amplitude of an echo is required. The simplest means for measuring the amplitude of each purse is to find the maximum and minimum of each echo. The difference between each max-min pair is the peak-to-peak amplitude which is 2 times the amplitude. This method is sensitive to noise though, as a single spike could easily become the local maximum and minimum.

A noise tolerant method to calculate the amplitude, which involves the entire echo, is to shift out the dc, then square the result and integrate as follows:

$$\text{mixed}_{xO}(t) \approx A\cos\alpha t + dc$$

$$\text{mixed}_{xO}(t) - dc \approx A\cos\alpha t + dc - dc = A\cos\alpha t$$

$$\int_0^{nT} (\text{mixed}_{xO}(t) - dc)^2 dt \approx \int_0^{nT} (A\cos\alpha t)^2 dt = \int_o^{nT} \frac{A^2}{2}(\cos(2\alpha t)+1) dt$$

$$= \frac{A^2}{2}(nT)$$

$$\therefore A = \sqrt{\frac{2\int_0^{nT}(\text{mixed}_{xO}(t) - dc)^2 dt}{nT}}$$

Figure 18:
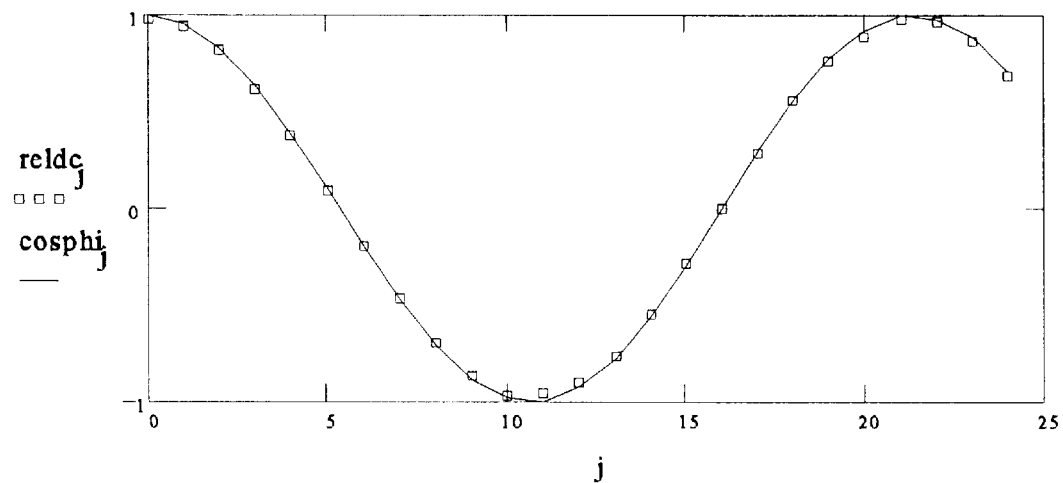
FIG. 18 is a graph illustrating the comparison of the model phase shift and the cosine(phase) shift per echo.
Figure 19:
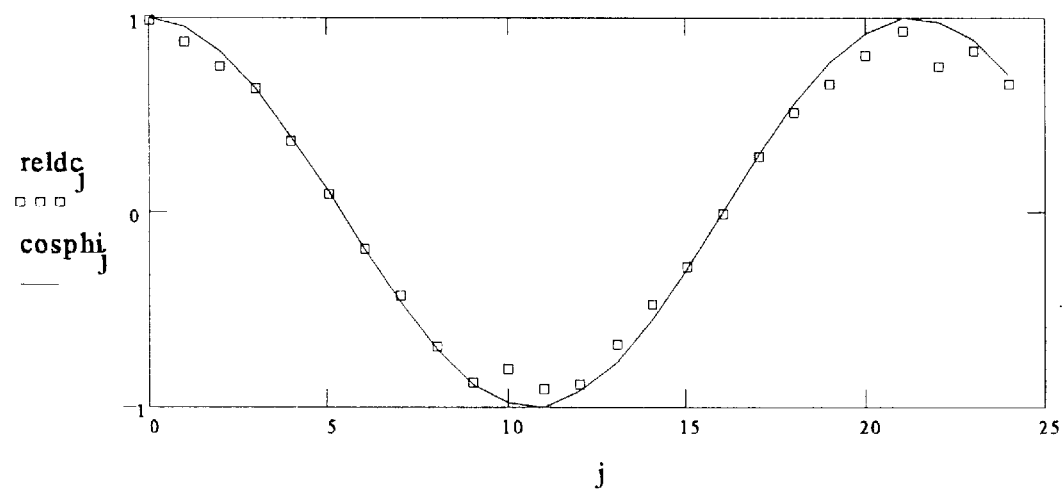
FIG. 19 is a representation of the comparison of FIG. 18 after adding 20% noise (by amplitude)

Having reference to FIGS. 18 and 19, the calculated value for the relative dc of the model is compared against the cosine of the actual phase shift introduced ($3\pi/32$) per echo. With no noise (FIG. 18), the match of relative dc compared against $\cos(\phi)$ is almost perfect. As shown in FIG. 19, even with the introduction of a 20% noise signal the tracking is still very good away from multiples of $\pi(0,1,2,\ldots)$.

Figure 20:
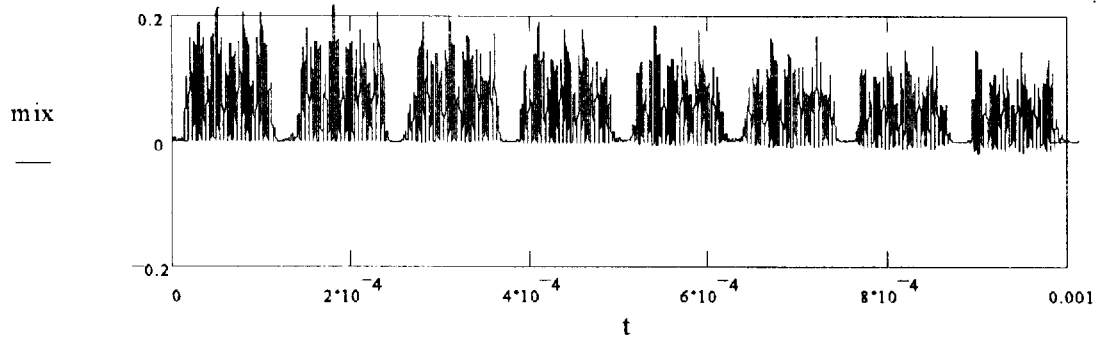
FIGS. 20–22 are graphs illustrating the effect of adding 20% noise to the signals of FIGS. 14–16 respectively.
Figure 21:
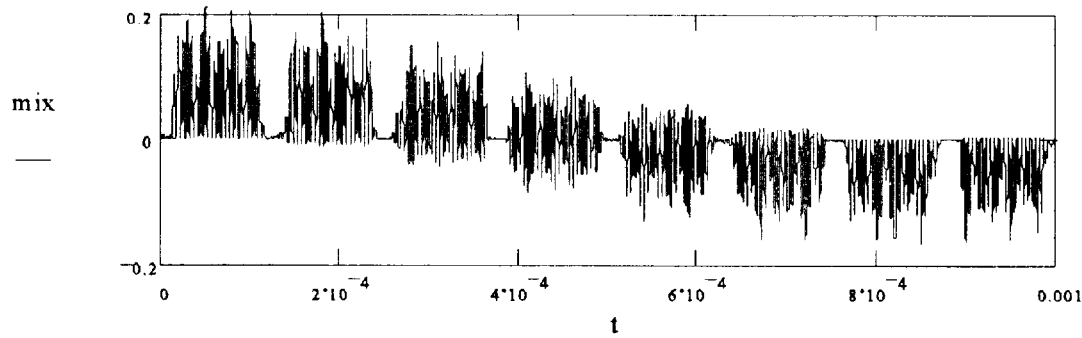
Figure 22:
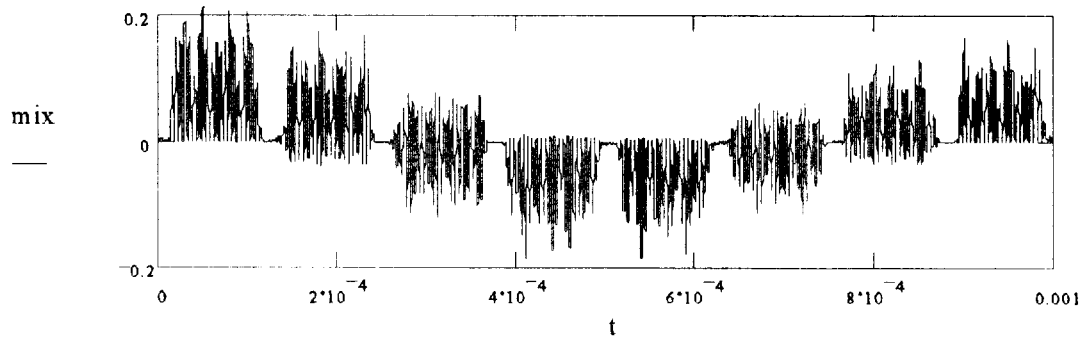

Applied to the signals depicted in FIGS. 14–16, the noise immunity of this method is demonstrated by adding 20% noise (by amplitude) to the signals and performing the same analysis. The result is shown in FIGS. 20–22, which continue to demonstrate the distinctive negative shift characteristic of the different materials.

EXAMPLE

Figure 23:
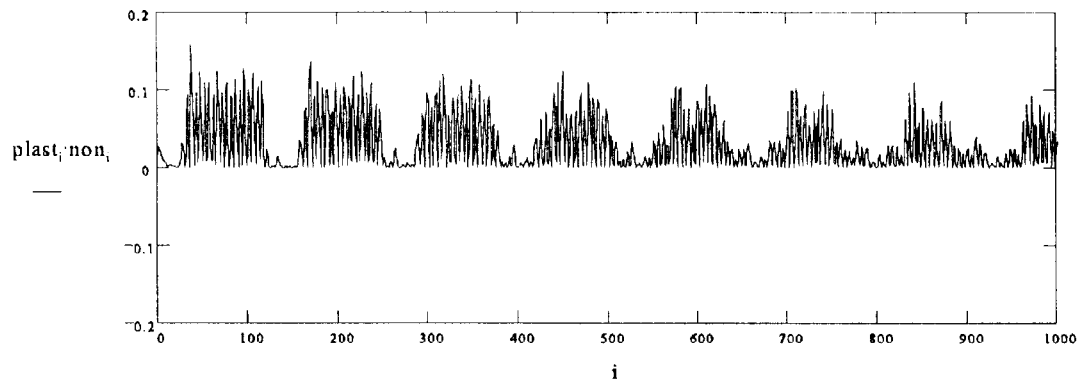
FIGS. 23–25 are actual mixed signals from contacts with plastic, rock and metal respectively.
Figure 24:
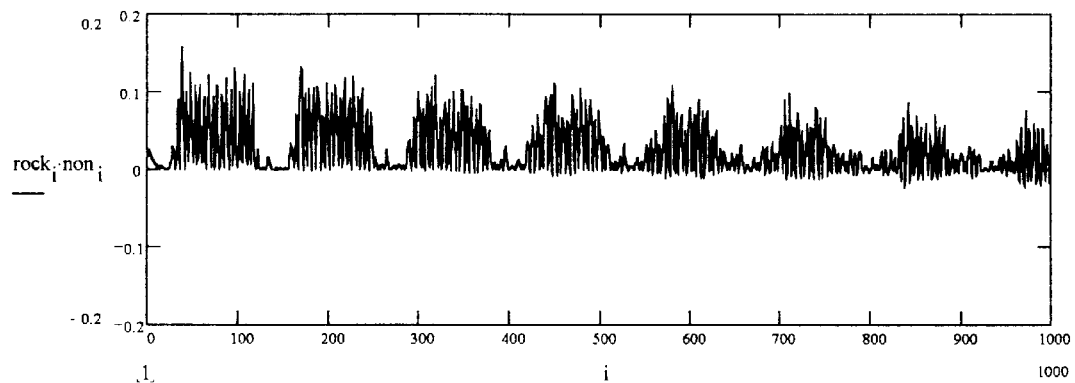
Figure 25:
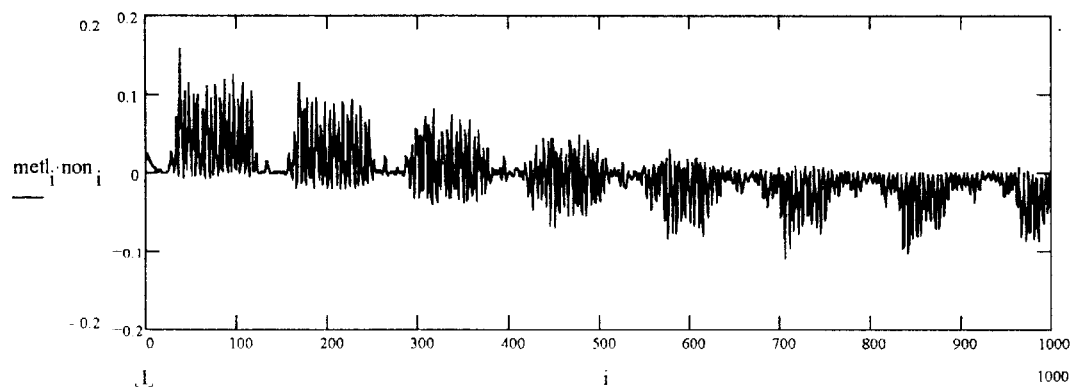
Figure 26:
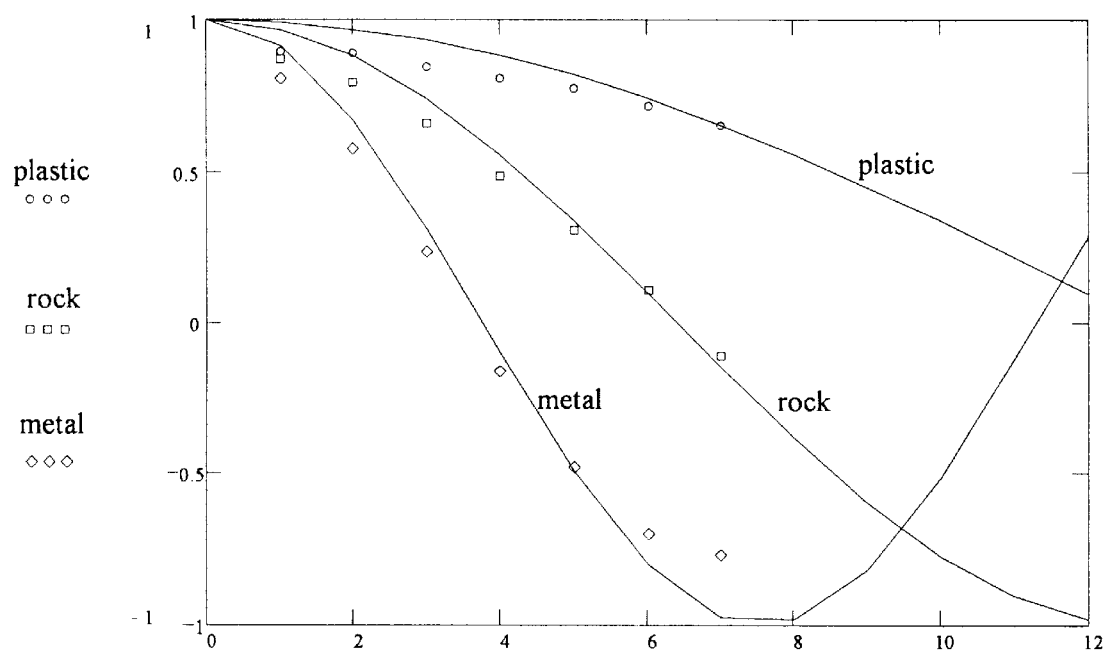
FIG. 26 is a graph illustrating the non-normalized data for plastic (circular symbol), rock (square symbol), and metal (diamond symbol) at each echo and having a cosine-fitted curve through each.

Data recordings of numerous pulse-echo streams were made. The samples were digitized with 10 bits of resolution at approximately 10 times the pulse frequency. The samples were mixed with a non-contact signal and analysed as described above. Plastic, rock and metal were tested. The mixed signal results are shown in FIGS. 23–25. The phase shift versus echo number, for each of the three materials, is shown in FIG. 26. The curves for each material is fitted with a best-fit cosine function.

Following the testing of a large number of objects, it was found, not surprisingly, that plastics and light materials occupied regions of limited phase shift (Low MI), rocks generally could be classed as having a medium phase shift (Medium MI), and metals had the highest phase shift rate (High MI).

Roughly, for a retrofitted manual prodder rod, the phase shift rates per echo for the different types of materials were:

plastic-like materials 0.03–0.04 π rock-like materials 0.055–0.09 π metal-like materials 0.08–0.15 π(i.e. Aluminum—steel)

The overlap between rock-like and metal-like is in part due the inclusion of a piece of haematite ($Fe_2O_3$) as a 'rock'. At a further extreme, a piece of high density alumina showed a phase shift rate of 0.2 π, beyond that of steel. Accordingly, occasionally a metal-like rock would be classified as metal. This would be a fail-safe situation which can increase the false alarm rate, but does result in safety for the operator.

Therefore, despite occasional metal-like rocks which would be classified as metal, the discrimination illustrated is sufficient to distinguish between the majority of these materials.

Figure 27:
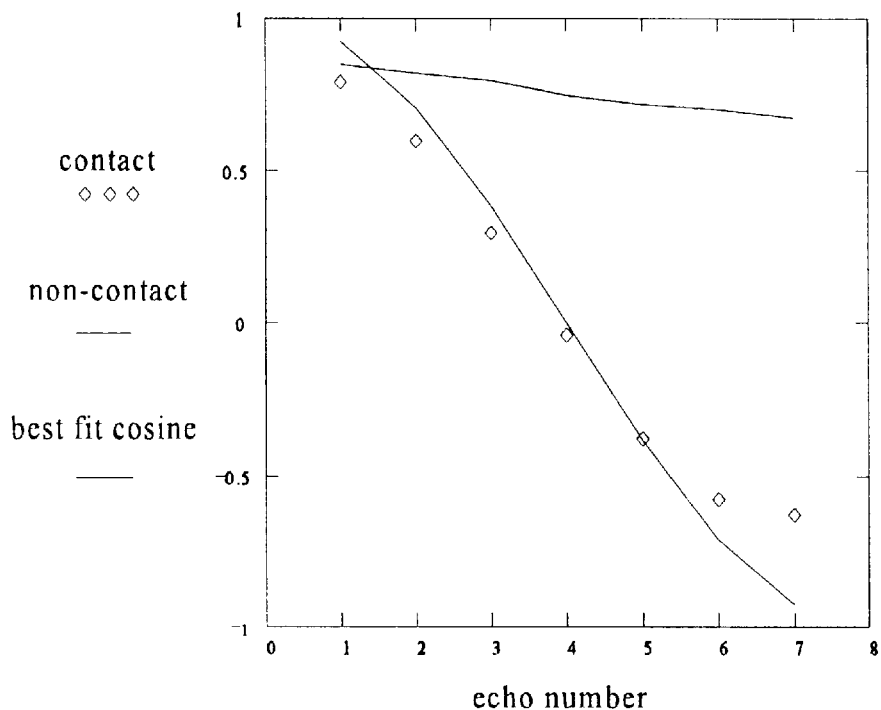
FIG. 27 is a graph illustrating a rod no contact trace demonstrating the system droop rate and non-normalized contact data (diamond symbols) and the cosine-fitted curve.
Figure 28:
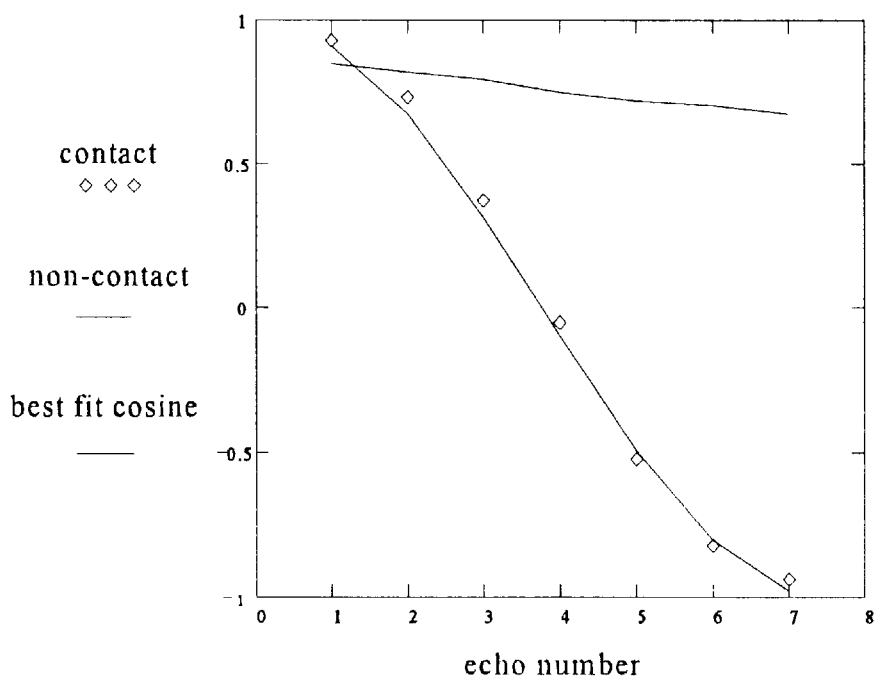
FIG. 28 is a graph illustrating the no contact data of FIG. 27 and demonstrating the normalized contact data (diamond symbols) and the improved match to the cosine-fitted curve.

Note that the theoretical relative dc values for a non-contact would experience no phase shift and should remain at a constant 1.0 for all echoes. The introduction of noise into the mathematical model disturbs the result near the reversal points, i.e. at 0, π, 2π, 3π, etc. Having reference to FIG. 27, it may be seen that a rod actually suffers a non-theoretical droop, representing a phase shift even in a non-contact instance. Thus the relative dc of a contact do not begin at +1 nor do they obtain a −1 at reversal. Using the non-contact droop, the contact results can be normalized and the scaling is restored to a theoretical +1 to −1 range, as shown in FIG. 28.

Further, the values for phase shift, at all frequencies, show a mild dependence upon the rod to contact application pressure. As shown in FIG. 29, a dimensionless solution for phase shift is presented for various materials over varying loads of 200–1200 grams. Generally, it is seen that phase shift is proportional to pressure. At a load of 600 grams, the interface between plastic-like and rock-like demonstrates a solution at about 2 and the interface between rock-like and metal-like is at a solution of about 8. At 200 grams the solution is about 1 and 6 respectively.

In use the digital processor stores reflected elastic wave data. The data may be that obtained from a non-contact "dry-fire" case, or from contact of the rod's sensing end with an object. Preferably non-contact calibration of the prodder rod's response alone is obtained both under ideal "factory" conditions and under field conditions, both of which involve sending an acoustic pulse along the rod when its sensing end is not contacting anything. Differences between factory and field non-contact data represent acoustical variations in the rod from new to used condition. Subtle variations are expected over time but large variations can advantageously serve to alert the user to mechanical failure such as separation of the crystal from the rod.

A field non-contact calibration can be initiated when upon powering the prodder on. The raw non-contact signals are analysed for phase shift and the resulting values are stored initially for factory case and subsequently for each field case. As stated, variations therebetween provide a basis for informing the user that the prodder has failed or is worn out.

Experimental testing for phase shift upon contact with known objects (FIG. 29) and mathematically mixing them with non-contact phase shift values provides thresholds or phase shift solution levels, for example: solution level 2 for a plastic/rock interface and level 8 for a rock/metal interface.

The solution may be conveniently be phrased in terms of the rate of change of the phase shift per echo or reflection. In FIG. 29, a solution of 2 represents the rate of change of the phase shift φ in units of 2*π/128 radians/echo.

Figure 29:
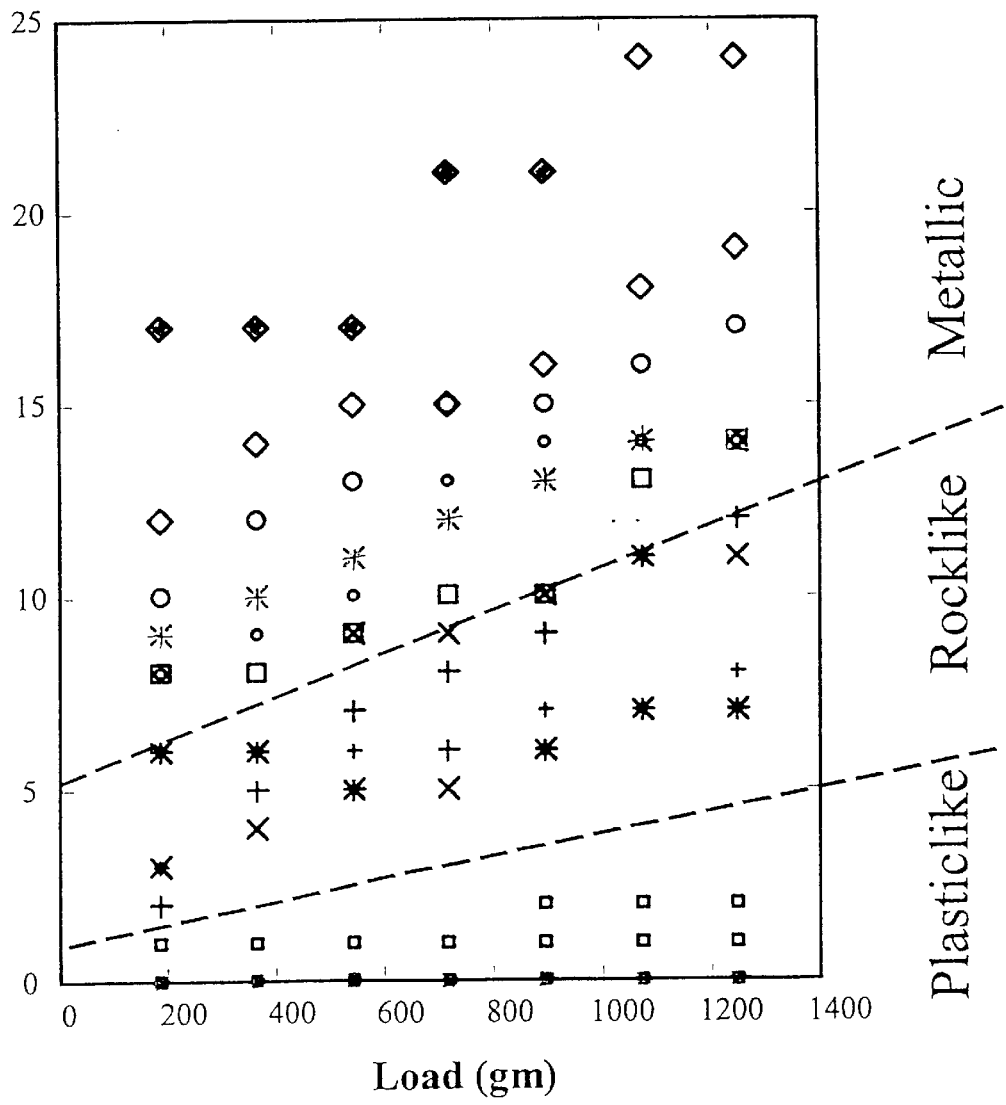
FIG. 29 is a scatter graph illustrating the effect of rod loading on phase shift rate for plastic-like (soft), rock-like (medium), and metal-like (hard) objects versus load in grams.

As seen in FIG. 29, if a phase shift solution is below level 2, the signal processor can distinguish the and identify the material of the unknown object as being soft or plastic-like. If the phase shift solution is above level 8, then the signal processor can state the material is hard or metal-like.

The phase shift solution levels are stored. The experimentally determined solution levels are selected to ensure borderline cases (i.e. which "might" be a rock) are conservatively interpreted as potentially hazardous plastic or metal.

Accordingly, in operation, when an unknown object is contacted, a raw signal is stored. Values for the contact phase shift are determined. The raw phase shift values for the unknown object are mixed with the field calibration non-contact phase shift values for removal of rod effects and the phase shift is determined for obtaining a solution (rate of change of phase shift per echo). The solution is compared against the stored solution levels. Conservatively, using the above means and method, up to 50% of rocks may be deemed to be either plastic or metal. More importantly, plastic or metal (potential mines) are detected substantially 100% of the time.

In summary, the preferred operation comprises storing phase shift solution levels for known materials, obtaining a field calibration of a non-contact case and storing the phase shift values; obtaining contact data and storing the phase shift values; mixing the non-contact and contact phase shift values to obtain a solution; and comparing the solution against the stored solution levels for distinguishing safe rock-like objects from potentially hazardous plastic-like or metal-like objects.

As shown in FIG. 29, the reflected wave can be affected by the pressure of the contact with the object and thus the solution levels vary with load. Variable load can be compensated for by measuring load and applying additional signal processing to dynamically adjust the solution levels accordingly.

The solutions can be further improved by adjusting the solution levels after a field non-contact calibration, based on the variation in field and factory non-contact data.

It is further understood that alternate means exist for generating signals indicative of the reflected wave including the use of strain gauges or by providing a second piezoelectric crystal separate from the driver crystal.

Signal noise can be compensated for by producing a quick succession of pulses upon contact with the object and statistically averaging the results for the corresponding reflected waves for improving confidence in the solution.

The embodiments of the invention in which an exclusive property or privilege is claimed are defined as follows:

1. A prodding rod having a driver end and a sensing end for contacting objects of unknown material comprising:

means for imparting mechanical energy into the rod which travels as an incident elastic wave from the driver end towards the sensing end and reflects at the sensing end as a reflected elastic wave travelling towards the driver end;

means for analysing the reflected elastic wave for its acoustical characteristics and emitting electrical signals indicative of the combined acoustical characteristics of the both the rod and with whatever the sensing end is in contact;

means for storing signals emitted for a reflected elastic wave where the rod's sensing end does not contact an object, representing the acoustical characteristics of the rod alone;

means for storing signals emitted for a reflected elastic wave where the rod's sensing end contacts an object of unknown material, representing the combined acoustical characteristics of the both the rod and the object of unknown material;

means for processing the signals obtained for the combined object of unknown material and rod against the stored signals obtained for the rod-alone and establishing a solution representing the phase shift in the wave for the object-alone;

means for storing pre-determined phase shift solution levels, said levels distinguishing the phase shift solution for objects of known material; and means for comparing the phase shift solution obtained for the object-alone against the stored phase shift solution levels so that the nature of the contacted object's material can be characterised.

2. The prodding rod as cited in claim 1 wherein the pre-determined phase shift solution levels are obtained from contacting the sensing end with a plurality of objects of known material, and selecting phase-shift solution levels which distinguish between object of known material characteristics.

3. The prodding rod as cited in claim 2 wherein two or more pre-determined phase-shift solution levels are selected and stored, each selected level being an interface between known material characteristics.

4. The prodding rod as cited in claim 3 wherein the rod is non-magnetic.

5. The prodding rod as cited in claim 3 wherein solutions falling between first and second solution levels are known inert materials and solutions below the first level and above the second level are known hazardous materials.

6. The prodding rod as cited in claim 4 wherein the known inert materials are rocks, the known hazardous materials below the first level are plastic-like materials and the known hazardous materials above the second level are metal-like materials.

7. The prodding rod as cited in claim 1 wherein the means for processing the signals for object and rod and the signals for rod-alone further comprises extracting a phase-dependent cosine term.

8. The prodding rod as cited in claim 7 wherein the solution and solution levels are defined in terms of the rate of change of the phase shift.

9. The prodding rod as cited in claim 1 wherein the means for processing the signals for object and rod and the signals for rod-alone further comprises multiplying the respective signals together.

10. The prodding rod as cited in claim 9 wherein the means for processing the signals for object and rod and the signals for rod-alone further comprises extracting a phase-dependent cosine term.

11. The prodding rod as cited in claim 10 wherein the solution and solution levels are defined in terms of the rate of change of the phase shift.

12. The prodding rod as cited in claim 2 further comprising:

means for measuring the load between the rod's sensing end and the object and emitting load signals; and means for analysing the load signals and dynamically adjusting the stored phase shift solution levels to more accurately represent object characteristics of a known nature.

13. The prodding rod as cited in claim 12 further comprising:

means for storing signals of the emitted for a reflected elastic wave where the rod's sensing end did not contact an object, representing the acoustical characteristics of the rod-alone in a new condition; and means for comparing the stored signals for the rod-alone when new and each subsequent stored signal for the rod-alone so as to identify changes in the signal for the rod-alone and emitting signals indicative of said changes.

14. The prodding rod as cited in claim 13 further comprising;

means for analysing the signals identifying the rod-alone signal-changes for indicating whether the prodding rod is functional.

15. The prodding rod as cited in claim 14 further comprising;

means for analysing the signals identifying the rod-alone signal-changes; and means for dynamically adjusting the pre-determined solution levels in response to the rod-atone signal-changes for more accurately representing object characteristics of a known nature.

16. A prodding rod having a driver end and a sensing end for contacting objects of unknown material comprising:

means for imparting mechanical energy into the rod which travels as an incident elastic wave from the driver end towards the sensing end and reflects from the object as a reflected elastic wave travelling towards the driver end;

means for analysing the reflected elastic wave for its acoustical characteristics and emitting raw electrical signals indicative of the acoustical characteristics of the combined object and rod;

means for storing signals emitted for a reflected elastic wave where the rod's sensing end did not contact an object, representing the acoustical characteristics of the rod alone;

means for processing the signals obtained for the combined object and rod with the stored signals obtained for the rod-alone for establishing a solution representing the phase shift in the wave for the object-alone;

means for storing pre-determined phase shift solution levels which represent selected phase shift solutions which distinguish differing known object acoustic characteristics; and means for comparing the phase shift solution obtained for the object-alone against the stored phase shift solution levels so that the nature of the contacted object's material can be characterised.

17. A method of determining the nature of the material of an object prodded by a rod having a driver and a sensing end, comprising the steps of:

(a) imparting an incident elastic wave into the driver end of the rod so that it travels longitudinally along the rod to the sensing end, which is not in contact with an object, where the wave reflects from the sensing end to form a reflected elastic wave travelling back towards the driver end;

(b) measuring the acoustic characteristic of the reflected elastic wave for a non-contact and emitting electrical signals indicative thereof;

(c) placing the sensing end in contact with an object of unknown material;

(d) imparting an incident elastic wave into the driver end of the rod so that it travels longitudinally along the rod to the sensing end and wave reflects from the object to form a reflected elastic wave travelling back towards the driver end;

(e) measuring the acoustic characteristic of the reflected elastic wave for a contact and emitting electrical signals indicative thereof;

(f) processing the signals for a non-contact and the object contact for determining values indicative of the phase shift of the object-alone and storing the solution; and (g) comparing the solution obtained for the object-alone against predetermined stored solution levels so that the nature of the contacted object's material can be characterised.

18. A prodding rod as recited in claim 17 wherein the solution is the rate of change of the phase shift per reflection.

19. A prodding rod as recited in claim 17 wherein the rod is non-magnetic for distinguishing inert objects from landmines.

20. A method of determining the nature of the material of an object prodded by a rod having a driver and a sensing end, comprising the steps of:

(a) imparting an incident elastic wave into the driver end of the rod so that it travels longitudinally along the rod to the sensing and, which is not in contact with an object, where the wave reflects from the sensing end to form a reflected elastic wave travelling back towards the driver end;

(b) measuring the acoustic characteristic of the reflected elastic wave for a non-contact and emitting electrical signals indicative thereof;

(c) storing the signals for the non-contact being indicative of the acoustical characteristics of the rod;

(d) performing steps (a) and (b) of the method by contacting the sensing end to a plurality of objects having materials of a known nature for emitting signals indicative of the combined acoustical characteristics of the known object and the rod;

(e) comparing each of the combined known object and rod signals with the signals for the rod-atone so as to determine solutions for the phase shift for the known object less the phase shift of the rod-alone for each known object;

(f) performing steps (a) and (b) of the method by contacting the sensing end to an objects having material of an unknown nature for emitting signals indicative of the combined acoustical characteristics of the unknown object and the rod;

(g) comparing each of the combined unknown object and rod signals with the signals for the rod so as to mix the phase shifts for the combined unknown object and rod and the phase shift of the rod for establishing a solution for the phase shift of the unknown object;

(h) comparing the solution obtained for the unknown object against the solutions for the known objects so that the nature of the unknown object's material can be characterised.

21. A prodding rod as recited in claim 20 wherein the solution is the rate of change of the phase shift per reflection.

22. A prodding rod as recited in claim 20 wherein the rod is non-magnetic for distinguishing inert objects from landmines.

* * * * *